United States Patent [19]

McCafferty et al.

[11] Patent Number: 4,498,264
[45] Date of Patent: Feb. 12, 1985

[54] ADHESIVELY BONDED TRAILER INCLUDING FIBER REINFORCED PANELS

[75] Inventors: Gerald P. McCafferty, Churchville; Stanley J. Navoczynski, Allentown; Robert W. Kinkle, Wayne, all of Pa.

[73] Assignee: The Budd Company, Troy, Mich.

[21] Appl. No.: 450,872

[22] Filed: Dec. 20, 1982

[51] Int. Cl.³ .............................................. E04B 2/60
[52] U.S. Cl. ...................................... 52/281; 52/481; 52/781; 296/181
[58] Field of Search ................. 52/281, 282, 234, 584, 52/775, 825, 586, 481, 601, 780, 781; 296/181, 183, 29, 30; 403/408, 266, 363; 312/263, 257 A

[56] References Cited

U.S. PATENT DOCUMENTS

| | | | |
|---|---|---|---|
| 3,192,671 | 7/1965 | Smith | 52/281 |
| 3,248,840 | 5/1966 | Petterson | 52/775 |
| 3,264,020 | 8/1966 | De Ridder | 52/282 |
| 3,303,626 | 2/1967 | Brigham | 52/583 |
| 3,692,349 | 9/1972 | Ehrlich | 296/181 |

Primary Examiner—James L. Ridgill, Jr.
Attorney, Agent, or Firm—Edward M. Farrell; Herman Foster; T. I. Davenport

[57] ABSTRACT

A panel of a trailer is adhesively bonded to a plurality of horizontal and vertical support rail structures which are secured to the main body of the trailer. Each of the structures include a pair of rail elements through which loads are transmitted into the panel by means of adhesively bonded joints between edges of the panel and the rail elements to provide sealing and support for the panel.

7 Claims, 6 Drawing Figures

ADHESIVELY BONDED TRAILER INCLUDING FIBER REINFORCED PANELS

BACKGROUND OF THE INVENTION

The use of reinforced fiber panels in trailers is well known. Generally, structural rail members surround the individual panel to provide support. The structural rail elements generally comprise somewhat "U" shaped members for receiving and supporting the panel. Large quantities of mechanical fasteners are generally used to secure the rail elements to the panel. The need for a large number of mechanical fasteners adds considerably to the cost of parts and labor in assembling the trailer.

Generally, a typical panel used in a trailer includes a plywood body having layers of woven glass, or other reinforcement material, on both surfaces. A decorative coating is generally put on the outer surface of the panel. A problem encountered in many prior art arrangements involving plywood panels is that water tends to leak between the panel and the support structures and reaches the core of the plywood body. This causes deterioration of the panel and requires a costly replacement procedure involving disassembly of a large number of mechanical parts and replacement of the panel.

OBJECTS OF THE INVENTION

It is an object of this invention to provide an improved trailer utilizing reinforced panels.

It is a further object of this invention to provide an improved trailer utilizing reinforced panels wherein the assembly cost is greatly reduced over the cost of many similar type trailers used heretofore.

It is a further obJect of this invention to provide an improved trailer in which a minimum number of mechanical fasteners are required to attach panels to support structures of the trailer body.

It is still a further object of this invention to provide an improved trailer utilizing reinforced panels in which improved sealing of the panels is provided.

It is still a further object of this invention to provide an improved trailer utilizing reinforced panels with improved durability and strength.

BRIEF SUMMARY OF THE INVENTION

In accordance with the present invention, reinforced wall panels are supported by a plurality of horizontal and vertical structures surrounding the edges of the panel. The structures each include a pair of rail elements disposed to receive the sides of the panel therebetween. The rail elements include spacer means which provide space between the panel and the rail elements after the rail elements are secured to the panel. Adhesive is provided in the space between the rail elements and the panel including the edges of the panel, generally before assembly, to provide joining and sealing between the panels and rail elements and around the edges of the panel. A minimum number of mechanical fasteners are required to secure the panel to the rail elements.

Other objects and advantages of the present invention will be apparent and suggest themselves to those skilled in the art, from a reading of the following specification and claims, taken in conjunction with the accompanying drawings.

BRIEF DESCRIPTION DRAWINGS

DETAILED DESCRIPTION OF THE PREFERRED EMBODIMENTS

Figure 1:
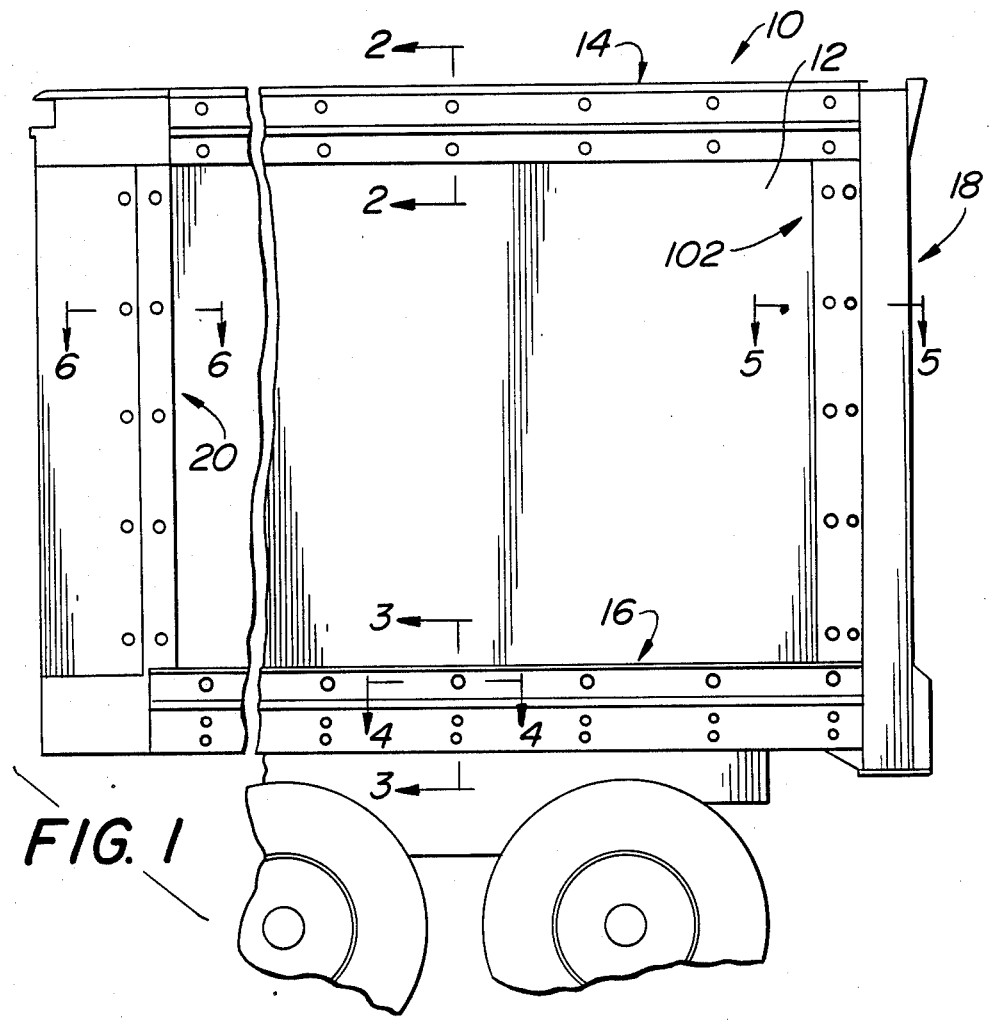
FIG. 1 is a side view of a portion of a typical panel trailer of a type which may utilize the present invention.

Referring to FIG. 1, a trailer 10 includes a panel 12 secured in place by upper horizontal structural members 14, lower horizontal structural members 16, rear vertical structural members 18 and front vertical structural members 20.

Figure 2:
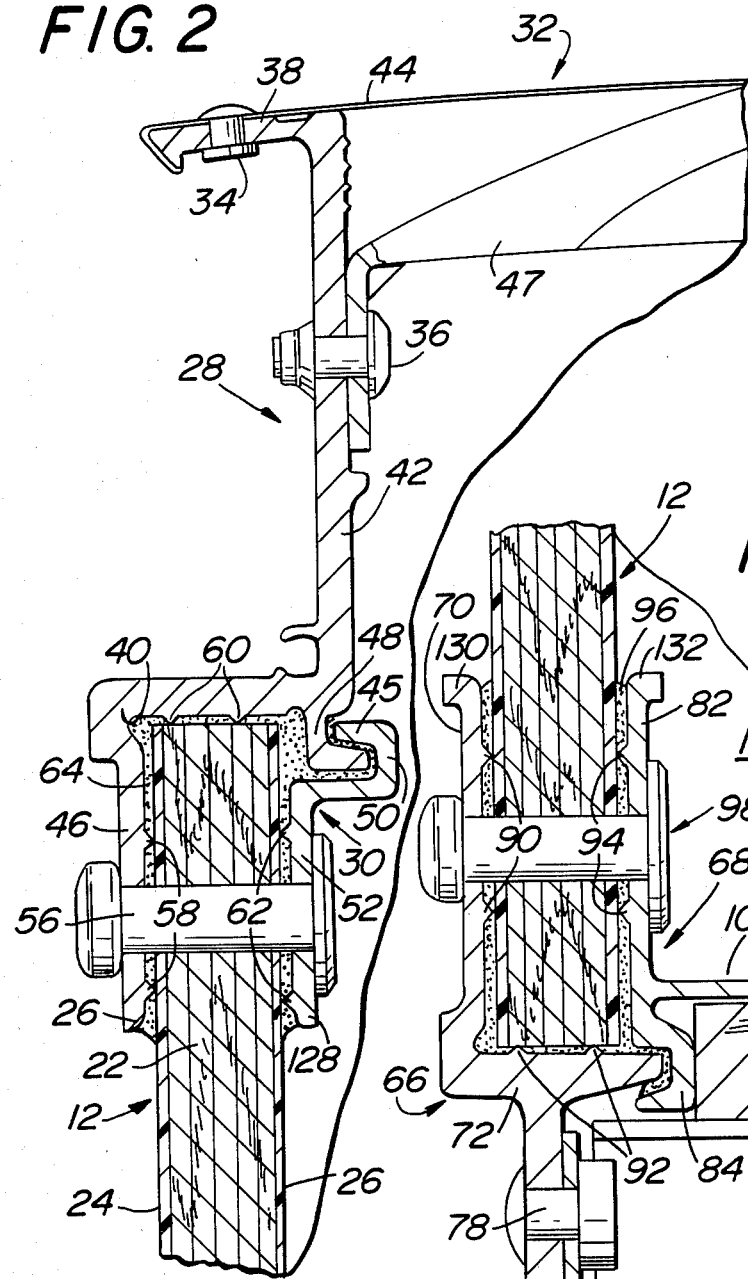
FIG. 2 is a cross-sectional view taken along lines 2—2 of FIG. 1.

Referring to FIG. 2, the panel 12 comprises a plywood body including a center core 22 made up of a plurality of layers of plywood. Layers of woven glass 24 and 26 cover the inner and outer surfaces of the panel 12. The outer surfaces 24 may include a gel coat or other decorative coating, not illustrated.

The top horizontal structural member 14 comprises a pair of rail elements 28 and 30. The rail 28 is attached to the roof structure 32 of the trailer by means of suitable fastening means such as a rivet 34 and a nut bolt assembly 36.

The top rail element 28 comprises a top portion 38, a bottom portion 40 and an intermediate portion 42. The top portion 38 is connected to the roof liner 32 by means of the rivet 34. The intermediate portion 42 is connected to a downwardly extending portion of the roof beam 47 by means of the nut and bolt assembly 36. The bottom portion 40 of the rail element 28 includes a downwardly projecting leg 46. A shorter leg 48 also extends down from the lower portion 40. The legs 46 and 48 are spaced to receive the panel 12 therebetween.

The rail element 30 includes an upper portion 50 and a lower portion 52. The upper portion 50 includes a lip portion 45 which extends into a recess toward the bottom of the rail assembly 28. This arrangement of the lip portion 45 extending into the recess of the rail element 28 provides an interlocking arrangement to accommodate different thicknesses of panels as well as accommodating panels made of different materials. The interlocking arrangement also provides a double shear arrangement between the split rails 28 and 30.

A mechanical fastener which may comprise a nut and bolt or rivet arrangement 56 extends through the downwardly projecting leg 46, through the panel 12 and through the leg portion 52. This fastener mechanically holds the panel 12 between the two rail elements 28 and 30.

The split rail arrangement including the rail elements 28 and 30 permits a relatively close fitting of the panel between the rail members. For example, if a fixed "U" rail member were used, as in many prior art systems, a close fitting for different size or thicknesses of panels would not be possible.

The bottom projecting leg 46 includes rib portions 58. The middle portion 40 includes rib portions 60. In like manner, the inner surface of the downwardly projecting leg 52 of the rail element 30 likewise includes projecting rib portions 62.

The rib portions 58, 60 and 62 provide spacing between the surfaces of the panel 12 as well as the edges thereof. This arrangement makes it possible to provide a uniform amount of adhesive material 64 between the inner surfaces of the rail elements 28 and 30 and the surfaces and edges of the panel 12. Generally, the adhesive material 64 is applied to the interior surfaces of the rail elements 28 and 30 prior to assembly. The rib portions 58, 60 and 62 assure that there is a uniform spacing and therefore a uniform amount of adhesive between the rail elements and the panel.

The adhesive material 64, in addition to securing the rail panels 28 and 30 to the panel 12, also provides a sealing between the rail structures and the panel 12. The sealing is especially important for the plywood core 22 which comprises the center of the panel 12. If moisture is allowed to penetrate between the rails and the panel to the core 22, it would tend to deteriorate and require replacement of the panel. The adhesive 64 prevents any moisture from reaching the core 22 of the panel 12.

Figure 3:
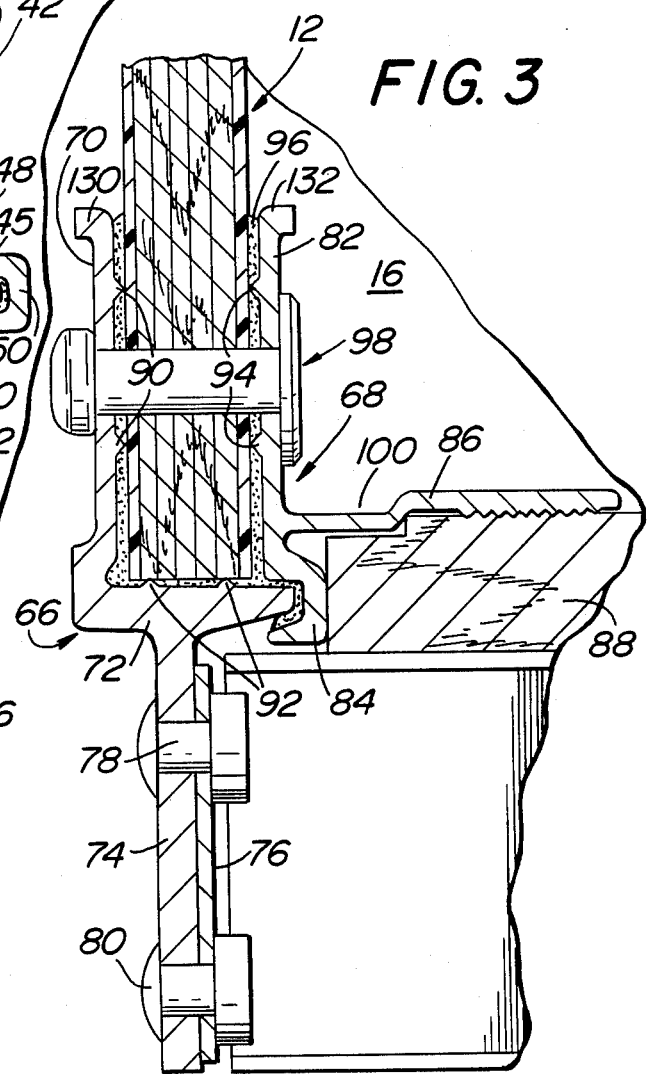
FIG. 3 is a cross-sectional view taken along lines 3—3 of FIG. 1.

Referring to FIG. 3 a similar split rail arrangement to that illustrated in FIG. 2 is also applicable to the bottom horizontal structural assembly 16. The panel 12 is secured between a pair of split rail members 66 and 68. The bottom rail element 66 includes a top upwardly extending leg portion 70, a center inwardly extending portion 72 and a lower downwardly extending leg portion 74.

The rail element 66 is secured to a bottom cross beam 76 of the trailer by suitable fasteners such as 78 and 80 which extend through the lower portion 74 and vertical portion of the cross beam 76.

The rail member 68 includes a top leg portion 82, a downardly extending leg portion 84 and an inwardly extending horizontal portion 86. The inwardly extending portion 86 rests on a floor 88 of the trailer assembly.

The intermediate portion 72 projects into a recess of the bottom portion 84 to provide a locking arrangement between the rail elements 66 and 68. Rib elements 90 provides spacing between the inner surface of the top portion 70 and the panel 12. In like manner, ribs 92 provide spacing between the bottom portion 72 and the bottom edge of the panel 12. Ribs 94 provide spacing between the top leg 82 and the panel 12. Adhesive material 64 is disposed between the rail elements and the surfaces of the panel 12 as well as between the bottom rail element and the lower edge of the panel 12.

The inner and outer rail elements 66 and 68 are secured to the panel by any suitable means, such as a mechanical fastener arrangement 98. A slight recess 100 may be provided in the inwardly extending section 86 to permit easy access and tightening of the nut and bolt assembly 98.

The interlocking arrangement between the two rail elements 66 and 68 provide resistance against shear forces. The split rail arrangement permits the rail members to accommodate panels of the different sizes while still providing relatively close contacts of the rail element with respect to the panel 12. A uniform thickness of adhesive is obtained because of the ribs 90, 92 and 94 which provide uniform spacing between the rails and the panel.

Figure 5:
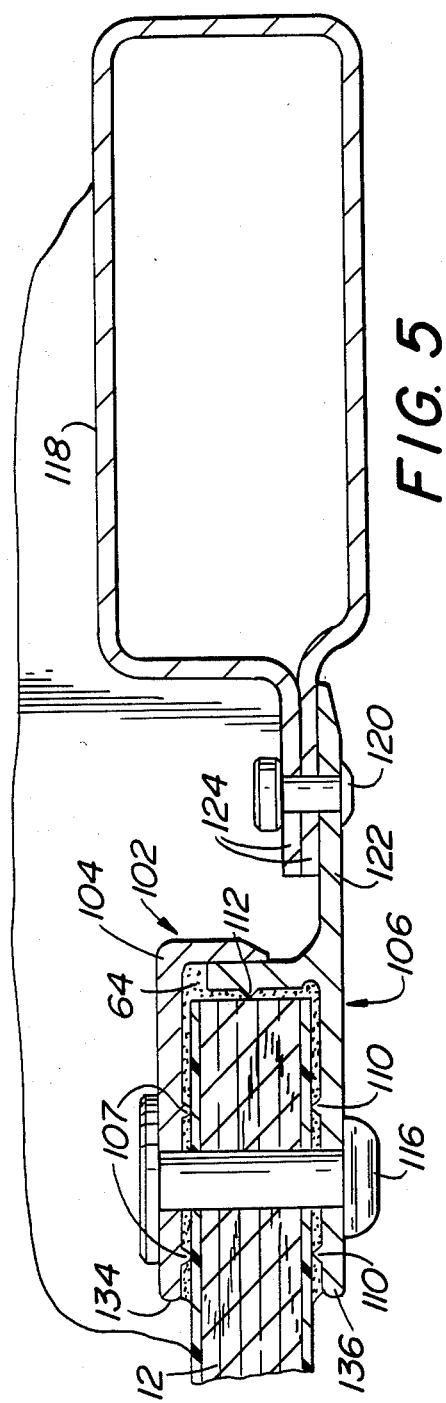
FIG. 5 is a cross-sectional view taken along lines 5—5 of FIG. 1.

Referring to FIG. 5, a substantially similar arrangement to those illustrated in FIGS. 2 and 3 is illustrated for a vertical structure 102. The structure includes an inner rail 104 and an outer rail 106. Spacing is provided between the inner rail 104 and the panel 12 by means of ribs 107. In like manner, spacing is provided between the outer rail 106 and the panel 12 by means of ribs 110. Ribs 112 provide spacing between the edge of the panel 12 and the outer rail 136. Adhesive material 64 provides means for securing the rails 104 and 106 to the panel 12 as well as providing a moisture proof arrangement to prevent moisture from reaching the core of the panel 12. The rails 102 and 106 are mechanically secured to the panels 12 by means of a mechanical fastener 116. The split rail assemblies including the rails 102 and 106 are suitably attached to the vertical beam 118 disposed toward the rear of the trailer and generally adapted to receive a trailer door therebetween (not illustrated). The split rail assembly is attached to the beam 118 by means of a mechanical fastener 120 which extends through a portion 122 of the rail 106 through extending projections 124 of the vertical beam 118.

Figure 6:
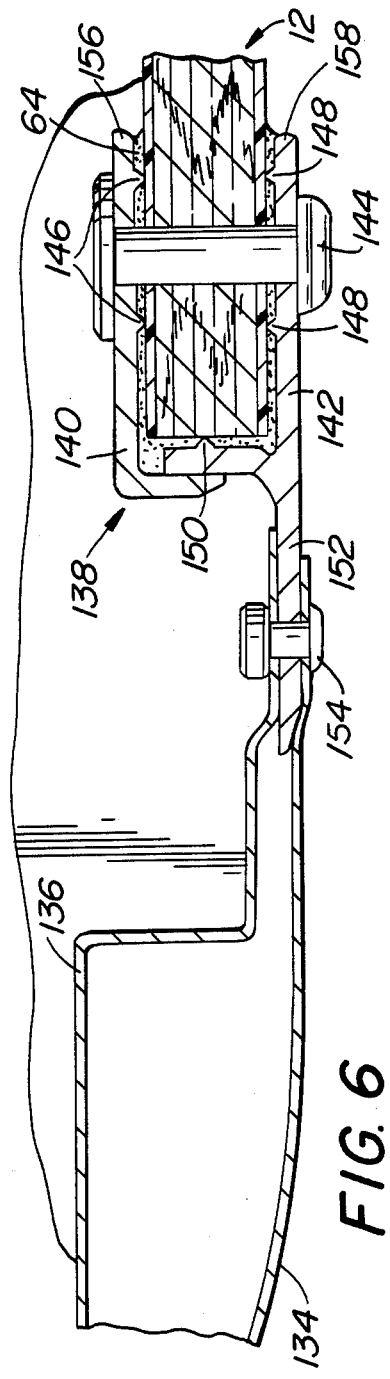
FIG. 6 is a cross-sectional view taken along lines 6—6 of FIG. 1.

Referring to FIG. 6, the vertical front rail assembly is similar to the front vertical and horizontal rail assemblies previously described. The front wall of the trailer includes an outer curved corner sheet 134 and a steel vertically disposed corner liner 136.

A front vertical rail assembly structure 138 comprises inner rail element 140 and outer rail element 142. Fastener means 144 is connected between the two rail elements 140 and 142 through the panel 12. The rail element 140 includes spacer ribs 146. The rail element 142 includes space ribs 148 in contact with the outer surface of the panel 12 and ribs 150 in contact with the edge of the panel 12. The adhesive material 64 is between the rail elements 140 to provide attachment and sealing between the rail elements and panel.

The rail element 142 includes an extending portion 152 which is connected between the corner sheet 134 and corner liner 136 by fastening means 154.

Figure 4:
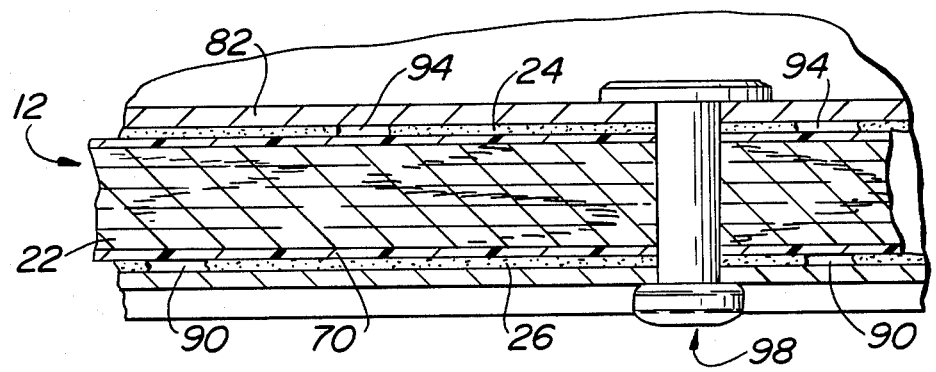
FIG. 4 is a cross-sectional view taken along lines 4—4 of FIG. 1.

The various advantages described in connection with the horizontal roof and floor rail structures illustrated in FIGS. 2, 3 and 4 are also applicable to the vertical support structures illustrated in FIGS. 5 and 6.

Consequently, it is seen that the entire edge around the panel 12 may be made load transmitting and moisture proof by the adhesive material 64. At the same time, the spacing ribs between the rail elements and panel assure that a uniform amount of adhesive is applied to assure proper attachment and sealing.

A feature of the present invention relates to the ends of the leg members of the rail elements which embrace the panel 12 therebetween. For example, curved lip ends 126 and 128 are included on the inner and outer top rails 28 and 30 (FIGS. 2, 3). Curved portions 130 and 132 are provided on rails 66 and 68. Curved lip portions 134 and 136 are provided on rail elements 104 and 106 (FIG. 5). Curved lip portions 156 and 158 are provided on rail elements 140 and 142 (FIG. 6). The curved lip portions of the rails are designed to permit disassembly of the rail elements from the panel for repair by placing the bond between the rail elements and panel in the peel mode. The curved ends facilitate the insertion of a tool for breaking the bond between the adhesive and rail elements.

The present invention has provided an improved adhesive connection that has load paths on both sides of the panel in both up and down directions. Because of the increased structural connections, shorter height rails may be employed. The two piece interlocking rails provide for combinations of different thicknesses of panels. The interlocking lip features employed between the channels provide shear strength.

While a minimum number of mechanical fasteners have been illustrated, those are primarily to hold the rails and panel in place during the curing of the adhesive. In some cases, especially where fast curing adhesives are involved, these holding elements or fasteners may be omitted.

What is claimed is:

1. In a trailer having a wall panel connected between a roof and floor,
   means for supporting said wall panel comprising:
   (a) top and bottom horizontal support structures extending along the roof and floor, respectively;
   (b) each of said horizontal support structures including inner and outer rail elements disposed to receive said panel therebetween;
   (c) means for securing said panel between said inner and outer rail elements;
   (d) adhesive means for bonding said inner and outer rail elements to the inner and outer edge surfaces and edges of said panel to provide sealing around the edges of said panel; and
   (e) spacer means between said inner and outer rail elements to provide uniform thickness of said adhesive means between said inner and outer rail elements and said panel.

2. The invention as set forth in claim 1 wherein front and rear vertical support structures connected between said roof and floor, each vertical support structure including inner and outer rail elements disposed to receive said panel therebetween, and said adhesive means further bonding said inner and outer rail elements to said panel to provide attachment and sealing completely around said panel.

3. The invention as set forth in claim 2 wherein said adhesive means provides a load transmission path between said panel and said horizontal and vertical support structures.

4. The invention as set forth in claim 3 wherein said inner and outer rail elements are disposed to receive panels of different thicknesses therebetween, and include inter locking means to provide shear resistance between said inner and outer rail elements.

5. The invention as set forth in claim 4 wherein said inner and outer rail elements include lip portions having curved ends to permit insertion of a tool to break the bond provided by said adhesive means and permit separation of said inner and outer rail elements from said panel.

6. The invention as set forth in claim 5 wherein said spacer means comprise a plurality of rib portions on the inner surfaces of said inner and outer rail elements in contact with said panel.

7. The invention as set forth in claim 6 wherein said panel comprises a plywood core having layers of woven glass on its inner and outer surfaces.

* * * * *